United States Patent Office 2,973,335

Patented Feb. 28, 1961

2,973,335

VULCANIZING SILICONE RUBBER IN PRESENCE OF ANTIOXIDANTS

Keistutis J. Stasiunas, New Haven, Conn., assignor to The Connecticut Hard Rubber Company, New Haven, Conn., a corporation of Connecticut No Drawing. Filed Sept. 26, 1956, Ser. No. 612,098

9 Claims. (Cl. 260—37)

This invention is a continuation in part of my copending application, Serial No. 413,966, filed March 3, 1954, now abandoned. This invention relates to vulcanizable and to vulcanized silicone rubber containing alkoxy-coated silicas, said rubbers needing to be protected against degradation during the vulcanization process in air ovens and also against degradation of the vulcanized product in service at high temperatures. By high temperatures I mean temperatures in excess of 300° F. and up to 650° F.

It is an object of this invention to provide for the addition of antioxidant bodies to silicone rubber recipes which contain alkoxy-coated silicas which are subsequently vulcanized by peroxides or other vulcanizing agents for silicone rubber. It has commonly been held that antioxidants and peroxides are not compatible one with the other in silicone rubber recipes. A statement to this effect was made in a publication report No. 54-4 prepared by D. B. Forman and W. G. Ogden of the Rubber Chemicals Division of E. I. du Pont de Nemours & Co. (Inc.), of Wilmington, Delaware, at the top of page 6, "Antioxidants are ineffective for improving heat service in stocks containing strong pro-oxidants such as benzoyl peroxide."

It is a further object to provide for the addition of antioxidant bodies to silicone rubber recipes which contain alkoxy-coated silica, such as the product known as Valron manufactured by the E. I. du Pont de Nemours & Co. (Inc.), and previously referred to in my copending application, Serial No. 413,966, as GS199S hydrophobic silica. This product, which has been identified by Iler in U.S. Patent 2,727,876, is called an estersil. An estersil is an organophilic solid in a supercolloidal state of subdivision, having an internal structure of inorganic siliceous material with a specific surface area of at least 1 $m.^2/g.$, having chemically bound to said internal structure —OR groups wherein R is a hydrocarbon radical, wherein the carbon atom attached to oxygen is also attached to at least one hydrogen, each —OR group having from 2 to 18 carbon atoms.

The class of products defined as estersils in Iler Patent 2,727,876 are amenable to the process of the present invention. These products are formed by the esterification of a finely divided inorganic siliceous solid with an alcohol of the formula ROH, wherein R is a hydrocarbon radical having at least 2 carbon atoms.

Examples of compounds of this class are normal straight chain alcohols such as ethyl, n-propyl, n-butyl, n-amyl, n-hexyl, n-heptyl, n-octyl, n-nonyl, n-decyl, n-undecyl, n-dodecyl (lauryl), n-tetradecyl (myristyl), n-hexadecyl (cetyl), and n-octadecyl (stearyl); branched chain primary alcohols such as isobutyl, isoamyl, 2,2,4-trimethyl-1-hexanol and 5,7,7-trimethyl-2-(1,3,3-trimethylbutyl)-1-octanol; secondary alcohols such as isopropyl, sec-butyl, 2-pentanol, 2-octanol, 4-methyl-2-pentanol, and 2,4-dimethyl-3-pentanol. Examples of alicyclic alcohols are cyclopentanol, cyclohexanol, cycloheptanol, and menthol. Examples of alcohols of the class having ethylenic unsaturation are allyl, crotyl, oleyl (cis-9-octadecen-1-ol), citronellol, and geraniol.

Acetylenic unsaturation is illustrated by propargyl alcohol. Araliphatic alcohols are illustrated by benzyl, 2-phenylethanol, hydrocinnamyl, and alpha-methylbenzyl. Cinnamyl alcohol is an example of an alcohol containing both aromatic and ethylenic unsaturation.

When saturated primary and secondary alcohols are used as the esterifying agents the resulting ester groups are, of course, alkoxy groups.

The saturated primary alcohols are especially useful because they react more readily and at lower temperatures than do secondary alcohols and are more stable than unsaturated alcohols at the temperatures of the reaction. On the other hand, for certain uses, such as incorporation of the esterified silica as a reinforcing filler in certain organic polymers, the silicas esterified with unsaturated alcohols are especially useful since subsequent treatment results in copolymerization of the unsaturated —OR groups on silica with active unsaturated linkages in the partially polymerized organic polymer.

Technically, there is no upper limit to the number of carbon atoms which may be present in the esterifying agent. As a practical matter, the group of alcohols having 2 to 18 carbon atoms include the majority of known monohydric alcohols and offer a selection of organic molecule sizes which should be adequate for any purpose.

In the product designated as Valron the —OR groups are butoxy groups which form an organophilic and hydrophobic coating which is known to be removable by heating the silica in presence of oxygen at temperatures above 200° F. The coating is likewise removed when a silicone rubber composition containing the filler is heated in air at temperatures in excess of 200° F. I have discovered that the presence of an antioxidant body in the composition containing the alkoxy-coated silica inhibits the removal of this coating, thus preserving the high tensile properties characteristic of the alkoxy-coated silica-silicone rubber compositions. The excellent reinforcement properties of such silicas was first brought out by Iler in U.S. Patent No. 2,727,876, although he gave no data to substantiate his claims in so far as silicone rubber compositions were concerned. The extremely high reinforcement value of the alkoxy-coated fillers was first demonstrated with data to substantiate the claims by Doede and Kilbourne in their copending application, Serial No. 294,066. In this application the vulcanizing action possessed by the alkoxy-coated silica, in addition to its value as a reinforcing agent, was demonstrated.

In addition to the alkoxy-coated silica which may serve as a vulcanizing agent, other types of vulcanizing agents which are not peroxides may be used in the presence of the antioxidant bodies which I add to preserve the high-temperature aging properties of the silicone rubber. Such other vulcanizing agents may be dithiocarbamate derivatives, as pointed out by Moroney in the copending application, Serial No. 590,118, filed June 8, 1956. It has also been observed by others that thiourea and certain strong alkalies such as triethylamine or strong acids may effect a cure of silicone rubber containing estersils, and I have observed that the addition of my antioxidants is beneficial in these cases also.

The usual method of compounding a silicone rubber recipe was followed in my work: The rubber or gum is a plastic nonelastic material almost liquid in consistency. It is placed on rubber mill rolls which it tends to coat immediately. An antistructure agent such as 0.5 part of diphenyl disilanol per 100 parts of rubber may be added. The filler is then added at the "bite" of the rolls and is gradually completely absorbed by and dispersed in the rubber. In my work Valron has been the principal filler but others may be added in addition to Valron. After thorough mixing of the rubber and fillers, the mixture is allowed to age, "ripen," or "wet" by standing idle for 1 to 3 days. Then it is remilled, at which time additional curing agents, fillers or antioxidants may be added. Next a weighed excess of rubber is placed in a heated mold which is then closed and heated for a period of from 10 minutes to 1 hour in a press at 200° to 350° F. This press cure confers sufficient rigidity to the rubber so that it may be removed from the mold, after which it may be used or tested. Usually, however, a longer period of heating at a higher temperature in an air oven is necessary to confer heat stability to the cured product.

I have found that my invention is applicable to organopolysiloxane rubbers of the empirical formula

in which R and R' are alkyl, aryl or alkylene groups, but with at least 75% of the R and R' groups being methyl groups. Typical rubbers meeting this definition would be those containing, for example, 100% methyl groups or 85% methyl groups plus 10% phenyl groups and 5% vinyl groups. I call such rubbers "essentially" dimethyl silicone rubbers.

The antioxidant bodies that I have tested and found effective fall into several well-defined classes which are as follows:

Type I. Secondary aryl amines and aliphatic or aromatic diamines.
Type II. Aromatic ethers.
Type III. Mono- and polynuclear phenols and dihydroxyphenols.
Type IV. Thiazines.
Type V. Carbon Blacks.
Type VI. Alkyl-substituted hydroquinones.

Examples of Type I that are effective are: N,N' di-$\beta$-naphthyl phenylene diamine; N,N' diphenylethylene diamine; N,N' diphenyl-p-phenylene diamine; N,N' di-o-tolylethylene diamine, phenyl-$\alpha$-naphthylamine, phenyl-$\beta$-naphthylamine, diphenylamine, p-isopropoxydiphenylamine, N,N' dioctyldiphenylamine.

Examples of Type II that are effective are: hydroquinone monomethyl ether, hydroquinone dibenzyl ether, hydroquinone monobenzyl ether, hydroquinone dimethyl ether.

Examples of Type III that are effective are: 1,5 dihydroxynaphthalene, 1,4-dihydroxynaphthalene, 2,6 di-t-butyl-p-cresol, 4 t-butylcatechol, 6 t-butyl-m-cresol, 2,2' methylene bis(4 ethyl-6-t-butyl phenol).

An example of Type IV is phenothiazine.

Examples of Type V are the carbon blacks known as Philblack O, Philblack A sold by the Phillips Petroleum Co. and Pelletex sold by the Godfrey L. Cabot Co., General Atlas Division.

Examples of Type VI are 2,5 di-t-butylhydroquinone, 2,5 di-t-amyl hydroquinone.

It is my intention to limit my invention to the incorporation of antioxidants in alkoxy-protected silica recipes. Silicone rubber is known to have excellent heat aging resistance in air at temperatures up to 500° F. and for times up to several hundred hours. At 500° F., however, it is commonly recognized in the industry that oxidation does occur since the rubber compounds tend to lose weight and traces of formaldehyde may be detected among the decomposition products. I have found that the presence of antioxidant bodies of several classes, as described above, tends to inhibit the cure of silicone rubber compositions, other than those containing the alkoxy-protected silica. Hence where complete reliance is placed on peroxides to develop cure, antioxidants are actually harmful.

I am familiar with the fact that Pfeiffer U.S. Patent No. 2,666,041 has used hydrocarbon ethers of hydroquinone as additives for silicone rubber compositions. These materials fall in my Class II and are antioxidants. Pfeiffer's use, however, was primarily for the purpose of reducing compression set as brought out in his patent, Column 1, lines 24–26, and in his Table VI. Hence he did not recognize the application of this material as an antioxidant in silicone rubber recipes containing estersils to retard the cure of the silicone rubber by the estersil, as is brought out in my invention.

I am also aware of the Smith Johannsen U.S. Patent No. 2,711,399, which has demonstrated that carbon black improves the heat stability of peroxide-cured organopolysiloxanes, heated in air. He did not include the case where the filler is an alkoxy-coated silica filler capable of vulcanizing the silicone rubber either in the presence or the absence of a peroxide. Hence I feel that carbon black logically may be included as an antioxidant of Type V of my invention.

The examples given below are to be considered as descriptive of the superior results possible when antioxidants are added to silicone rubber compositions containing alkoxy-protected silica fillers such as the butoxy-protected silica known as Valron, but are not to be construed as limiting the invention to the specific antioxidants used nor to the specific peroxides or fillers, other than the estersil, that may be used in addition to the estersil.

The properties listed in the following Examples 1 through 12, opposite the word "Press," were measured after 20 minutes at 350° F. in an electrically heated press at about 400 p.s.i. The oven properties were taken following an additional 16 hours at 400° F. in an air-circulating oven, and the aged properties were taken after an additional 70 hours at 400° F. in an air-circulating oven. The abbreviations used are:

Mod.—Stress in p.s.i. at 400% elongation for press cured slabs; stress in p.s.i. at 200% elongation for oven cured slabs; stress in p.s.i. at 100% elongation for aged slabs.
T—Tensile stress at ultimate elongation in p.s.i.
E—Ultimate elongation in percent.
H—Durometer—Shore A—Hardness.
Tr—Tear strength in p.p.i. (pounds per inch).

The dimethyl siloxane polymer used was General Electric Co. Silicone Rubber 81465. The methyl phenyl vinyl siloxane polymer was GE 81653. The methyl phenyl vinyl ethyl siloxane polymer was Union Carbide and Carbon Co. X97 (Lot 1352). The antinerve agent used was GE 81499, which is 50 parts of dimethyl silicone rubber and 50 parts diphenylsilanediol, and the zinc oxide was St. Joe Lead Co. Grade XX 78. The Valron filler used was a butoxy estersil produced by the Grasselli Chemical Division of E. I. du Pont de Nemours & Co. (Inc.) during the year 1954.

In the examples which are given below the use of antioxidants of all of the above classes are demonstrated.

I have found that the above classes of antioxidants may be used in the presence of certain organic peroxides suitable for vulcanizing silicone rubber. Among the more suitable peroxides for use in the presence of antioxidants are ditertiarybutyl peroxide and dicumyl peroxide. Ditertiarybutyl peroxide is quite volatile and is usually used in the form of a masterbatch called K1960 manufactured by the Union Carbide and Carbon Company. This mixture of the peroxide, silicone rubber and an unknown ingredient serves to hold the ditertiarybutyl peroxide in the rubber until the rubber is vulcanized in a closed press. I have also found that organic peroxide such as 2-4-dichlorobenzoyl peroxide or benzoyl peroxide may be used in the presence of antioxidants, but their effect is nullified to a large degree by partial reaction with the antioxidant. Apparently antioxidants and certain peroxides such as 2-4-dichlorobenzoyl peroxide react with each other and tend to destroy each other because not only is the curing activity of the peroxide reduced but the preservative effect of the antioxidant is also reduced, as will be seen in the examples below. A similar result usually occurs with benzoyl peroxide also. Other peroxides such as dicumyl peroxide appear to be less harmful to antioxidants. It is not my intention to limit my invention to the use of any specific peroxide since only a limited number of peroxides have been investigated. A sufficient number have been investigated, however, to prove that there are known peroxides which will vulcanize silicone rubber without destroying the antioxidant bodies which have been added for the purpose of preserving the rubber after the peroxide has carried out its vulcanizing action.

*Example 1*

In this example, dimethyl silicone rubber was vulcanized, following the teachings of Doede and Kilbourne (copending application Serial No. 294,066), with Valron estersil. In the absence of antioxidant, the aged sample became very hard and short in elongation. This was also true of the oven-cured sample. In the presence of antioxidants all oven-cured and aged samples preserved their softness to a large degree. In order of effectiveness the antioxidants were:

Phenothiazine
N,N′ di-octyl diphenylamine
2,6 di-tert. butyl-p-cresol
4-tert. butyl catechol
2,2′ methylene bis (4 ethyl-6 tert. butyl phenol)
Philblack 0
Hydroquinone monobenzyl ether The 4-t-butyl catechol, while showing a beneficial effect on the physical properties of the stock after oven curing and after aging, also appears to have accelerated the cure slightly in the press.

Recipe:

| | |
|---|---|
| Dimethylsiloxane gum | 100 |
| Antinerve agent | 2 |
| Valron | 50 |
| Zinc oxide | 5 |
| Antioxidant as listed | 1 |

| | Mod. | T | E | H | Tr |
|---|---|---|---|---|---|
| No antioxidant | | | | | |
| Press | -------- | 30 | 70 | 25 | -------- |
| Oven | -------- | 680 | 160 | 81 | 60 |
| Age | -------- | 650 | 25 | 89 | 30 |
| N,N′-Di-octyldiphenylamine | | | | | |
| Press | 10 | 20 | 875 | 23 | -------- |
| Oven | 230 | 1,210 | 720 | 60 | 195 |
| Age | 360 | 910 | 475 | 75 | 195 |
| 2,6 Di-t-butyl-p-cresol | | | | | |
| Press | 25 | 40 | 800 | 23 | -------- |
| Oven | 210 | 1,520 | 850 | 60 | 210 |
| Age | 450 | 890 | 400 | 76 | 190 |
| Philblack O | | | | | |
| Press | -------- | 0 | 150 | 18 | -------- |
| Oven | 180 | 860 | 700 | -------- | 200 |
| Age | 345 | 630 | 340 | 72 | 164 |
| 4-t Butyl Catechol | | | | | |
| Press | 40 | 185 | 1,015 | 33 | -------- |
| Oven | 270 | 1,500 | 750 | 66 | 260 |
| Age | 505 | 1,025 | 380 | 84 | 155 |
| 2,2′-Methylene bis (4-ethyl-6-tert.-butyl phenol) | | | | | |
| Press | 20 | 30 | 840 | 22 | -------- |
| Oven | 280 | 1,520 | 775 | 64 | 215 |
| Age | 480 | 920 | 350 | 84 | 185 |
| Hydroquinone monobenzyl ether | | | | | |
| Press | -------- | 25 | 350 | 20 | -------- |
| Oven | 180 | 950 | 750 | 56 | 180 |
| Age | 400 | 615 | 270 | 74 | 210 |
| Phenothiazine | | | | | |
| Press | -------- | 20 | 365 | 23 | -------- |
| Oven | 200 | 970 | 740 | 50 | 165 |
| Age | 265 | 1,140 | 625 | 63 | 200 |

*Example 2*

In this example dimethyl silicone rubber was vulcanized with 2,4 dichlorobenzoyl peroxide, as well as with Valron estersil, in the presence of antioxidants. The amount of peroxide was purposely kept low to avoid interaction with the antioxidants. Evidence of a greater degree of press cure as compared with Example 1 may be seen. In the absence of antioxidant the aged sample is hard and short, but all of the antioxidants caused an enhancement of properties after 16 hours of 400° F. oven curing and better retention of these properties after 400° F. oven aging. N,N[1] di-β-naphthyl-p-phenylene diamine was best of this series and phenothiazine second best. The generally lower elongations and higher hardness figures in this series, as compared with those in Example 3 which follows, indicate that part of the antioxidant was destroyed by 2,4 dichlorobenzyl peroxide. However enough of it remained to provide fair heat aging resistance in all cases tested.

Recipe:

| | |
|---|---|
| Dimethylsiloxane gum | 100.0 |
| Antinerve agent | 2.0 |
| Valron | 50.0 |
| Zinc oxide | 5.0 |
| 2,4 dichlorobenzoyl peroxide | 0.3 |
| Antioxidant | 1.0 |

| | Mod. | T | E | H | Tr |
|---|---|---|---|---|---|
| No antioxidant | | | | | |
| Press | 25 | >170 | >1,200 | 52 | -------- |
| Oven | 700 | 840 | 275 | 82 | 210 |
| Age | -------- | 650 | 35 | 90 | 15 |
| N,N[1]-Di-β-naphthyl-p-phenylenediamine | | | | | |
| Press | 55 | 100 | 800 | 28 | -------- |
| Oven | 340 | 1,450 | 675 | 63 | 265 |
| Age | 550 | 730 | 235 | 81 | 160 |
| Hydroquinone monobenzyl ether | | | | | |
| Press | 25 | 65 | 615 | 25 | -------- |
| Oven | 400 | 1,160 | 640 | 68 | 260 |
| Age | -------- | 555 | 70 | 72 | 60 |
| Phenothiazine | | | | | |
| Press | 60 | >110 | >1,100 | 25 | -------- |
| Oven | 390 | 1,390 | 650 | 69 | 250 |
| Age | 585 | 800 | 265 | 79 | 205 |
| Philblack O | | | | | |
| Press | 5 | 50 | 1,010 | 26 | -------- |
| Oven | 330 | 1,300 | 690 | 63 | 235 |
| Age | 575 | 610 | 125 | 82 | 66 |

*Example 3*

In this example, dicumyl peroxide in a low concentration was used as curing agent. Other ingredients were the same as Example 2.

The order of effectivity of the antioxidant was much the same as Example 1. For some reason hydroquinone monobenzyl ether and phenothiazine prevented the attainment of good initial properties but were effective in preserving those values which were attained. It seems likely that these antioxidants were strong enough to react with peroxide preventing it from being completely effective on the rubber.

Recipe:

| | |
|---|---|
| Dimethylsiloxane gum | 100.0 |
| Antinerve agent | 2.0 |
| Valron | 50.0 |
| Zinc oxide | 5.0 |
| Dicumyl peroxide | 0.3 |
| Antioxidant | 1.0 |

| | Mod. | T | E | H | Tr |
|---|---|---|---|---|---|
| **No antioxidant** | | | | | |
| Press | 35 | 35 | 405 | 32 | --- |
| Oven | 680 | 775 | 250 | 76 | 200 |
| Age | --- | 625 | 30 | 90 | 15 |
| **N,N'-Di-β-naphthyl-p-phenylenediamine** | | | | | |
| Press | 50 | 50 | 790 | 23 | --- |
| Oven | 245 | 1,375 | 750 | 59 | 175 |
| Age | 375 | 980 | 495 | 72 | 230 |
| **N,N'-Di-octyl diphenylamine** | | | | | |
| Press | 45 | 50 | 850 | 25 | --- |
| Oven | 230 | 1,280 | 725 | 62 | 185 |
| Age | 420 | 975 | 430 | 78 | 180 |
| **2,6 Di-t-butyl-p-cresol** | | | | | |
| Press | 25 | 30 | 725 | 28 | --- |
| Oven | 240 | 960 | 640 | 63 | 205 |
| Age | 420 | 795 | 325 | 80 | 265 |
| **4-t Butyl catechol** | | | | | |
| Press | 35 | 105 | 950 | 31 | --- |
| Oven | 260 | 1,505 | 725 | 67 | 250 |
| Age | 515 | 1,005 | 375 | 83 | 185 |
| **2,2' Methylene bis (4-ethyl-6-t-butylphenol)** | | | | | |
| Press | 15 | 25 | 715 | 25 | --- |
| Oven | 320 | 1,350 | 700 | 65 | 255 |
| Age | 525 | 820 | 260 | 83 | 145 |
| **Hydroquinone monobenzyl ether** | | | | | |
| Press | --- | 35 | 320 | 19 | --- |
| Oven | 195 | 725 | 620 | 58 | 170 |
| Age | 375 | 590 | 270 | 53 | 190 |
| **Phenothiazine** | | | | | |
| Press | 30 | 30 | 400 | 15 | --- |
| Oven | 190 | 575 | 615 | 46 | 185 |
| Age | 195 | 470 | 425 | 60 | 180 |
| **Philblack O** | | | | | |
| Press | --- | 0 | 110 | 19 | --- |
| Oven | 200 | 650 | 590 | 45 | 160 |
| Age | 370 | 515 | 275 | 68 | 135 |

*Example 4*

Di-t-butyl peroxide was used here in an experiment similar to that of Example 2. This peroxide was probably ineffective with dimethyl rubber at the 350° F. press temperature. Its presence was not harmful to the antioxidants which again lined up in the same order as in Example 1. It is noteworthy that, although the hydroquinone monobenzyl ether is not as effective in preserving elongation, it appears to be very effective in retarding hardness increase on aging.

Recipe:

| | |
|---|---|
| Dimethylsiloxane gum | 100.0 |
| Antinerve agent | 2.0 |
| Valron | 50.0 |
| Zinc oxide | 5.0 |
| Di-t-butyl peroxide | 0.3 |
| Antioxidant | 1.0 |

| | Mod. | T | E | H | Tr |
|---|---|---|---|---|---|
| **No antioxidant** | | | | | |
| Press | 30 | 65 | 800 | 32 | --- |
| Oven | 715 | 715 | 200 | 80 | 120 |
| Age | --- | 520 | 25 | 90 | 10 |
| **N,N'-Di-β-naphthyl-p-phenylenediamine** | | | | | |
| Press | 70 | 75 | 1,100 | 26 | --- |
| Oven | 220 | 1,270 | 750 | 59 | 175 |
| Age | 335 | 975 | 500 | 70 | 220 |
| **Hydroquinone monobenzyl ether** | | | | | |
| Press | --- | 0 | 295 | 17 | --- |
| Oven | 150 | 500 | 625 | 42 | 120 |
| Age | 235 | 385 | 275 | 36 | 130 |
| **Phenothiazine** | | | | | |
| Press | 30 | 30 | 400 | 16 | --- |
| Oven | 190 | 575 | 615 | 46 | 185 |
| Age | 195 | 470 | 425 | 60 | 180 |
| **Philblack O** | | | | | |
| Press | --- | 30 | 355 | 19 | --- |
| Oven | 190 | 910 | 730 | 47 | 215 |
| Age | 310 | 810 | 460 | 67 | 170 |

*Example 5*

Here we have a methyl phenyl vinyl gum, vulcanized only with Valron estersil, in the presence or absence of antioxidants. There was little cure in the press except with thiourea which was present to the extent of 1 percent. Thiourea is evidently a curing catalyst. The rise in the standing of Philblack O is noteworthy. The order of effectiveness of the antioxidants appears to be:

N,N'-di-octyl diphenylamine
N,N'-di-β-naphthyl-p-phenylene diamine
Philblack O
Phenothiazine
1,5 dihydroxy naphthalene
Hydroquinone monobenzyl ether
2,6 Di-t-butyl-p-cresol
4-t-butyl catechol
2,2' Methylene bis (4 ethyl 6-t-butyl phenol)
Thiourea Recipe:

| | |
|---|---|
| Methylphenyl vinyl siloxane gum | 100.0 |
| Antinerve agent | 1.0 |
| Valron | 50.0 |
| Zinc oxide | 5.0 |
| Antioxidant | 1.0 |

| | Mod. | T | E | H | Tr |
|---|---|---|---|---|---|
| No antioxidant | | | | | |
| Press | 15 | 20 | 425 | 25 | -------- |
| Oven | 595 | 930 | 350 | 75 | 195 |
| Age | -------- | 650 | 50 | 86 | 20 |
| N,N′-Di-β-naphthyl-p-phenylenediamine | | | | | |
| Press | -------- | -------- | 640 | 17 | -------- |
| Oven | 135 | >950 | >800 | 53 | 176 |
| Age | 265 | 955 | 640 | 69 | 190 |
| N,N1-Di-octyldiphenylamine | | | | | |
| Press | 15 | 15 | 650 | 20 | -------- |
| Oven | 200 | 1,020 | 730 | 53 | 125 |
| Age | 270 | 920 | 500 | 66 | 135 |
| 2,6 Di-t-butyl-p-cresol | | | | | |
| Press | 10 | 15 | 590 | 18 | -------- |
| Oven | 170 | 1,090 | 800 | 52 | 90 |
| Age | 340 | 820 | 375 | 70 | 180 |
| 4-t-butylcatechol | | | | | |
| Press | 30 | 35 | 640 | 21 | -------- |
| Oven | 240 | 1,120 | 700 | 60 | 155 |
| Age | 440 | 805 | 300 | 77 | 200 |
| 1,5-dihydroxynaphthalene | | | | | |
| Press | 10 | 10 | 415 | 11 | -------- |
| Oven | 195 | 580 | 600 | 54 | 60 |
| Age | 400 | 705 | 320 | 75 | 80 |
| 2,2′-methylene bis(4-ethyl-6-tert-butylphenol) | | | | | |
| Press | 5 | 10 | 525 | 18 | -------- |
| Oven | 210 | 1,150 | 750 | 57 | 140 |
| Age | 410 | 840 | 375 | 75 | 245 |
| Hydroquinone monobenzyl ether | | | | | |
| Press | 25 | 25 | 665 | 17 | -------- |
| Oven | 190 | 1,205 | 825 | 52 | 145 |
| Age | 400 | 865 | 405 | 72 | 200 |
| Phenothiazine | | | | | |
| Press | 25 | 40 | 865 | 20 | -------- |
| Oven | 190 | 1,000 | 760 | 50 | 215 |
| Age | 265 | 875 | 525 | 62 | 225 |
| Thiourea | | | | | |
| Press | 315 | 1,170 | 850 | 61 | -------- |
| Oven | 465 | 750 | 350 | 74 | 135 |
| Age | 505 | 625 | 175 | 82 | 170 |
| Philblack O | | | | | |
| Press | 0 | 0 | 575 | 17 | -------- |
| Oven | 180 | 850 | 725 | 47 | 155 |
| Age | 280 | 930 | 520 | 62 | 195 |

If we use the hardness figures as a measure of degree of press cure, we find the following order for effectiveness of antioxidants in the lower (curing) temperature range:

| Stock | Cure |
|---|---|
| Stock with 1,5-dihydroxynaphthalene | Least cure (antioxidant most effective). |
| Stock with Philblack O<br>Stock with N,N′-di-β-naphthyl-p-phenylenediamine.<br>Stock with hydroquinone monobenzyl ether<br>Stock with 2,6-di-t-butyl-p-cresol<br>Stock with 2,2′-methylene-bis (4-ethyl-6-tert.-butylphenol). | Next least cure. |
| Stock with N,N′-di-octyldiphenylamine<br>Stock with phenothiazine<br>Stock with 4-t-butylcatechol | Next most cure. |
| Stock with no antioxidant | Next to most cure. |
| Stock with thiourea | Most cure by far. |

At higher curing temperatures, when some of the antioxidant may be lost by evaporation, the order of effectiveness is different.

*Example 6*

In this example, we encounter the strong curing activity of 2,4-dichlorobenzoyl peroxide in the presence of a highly reactive gum, methyl phenyl vinyl siloxane. This is brought out in the first part of the table where no antioxidant was present. The rapid decay in properties due to Valron curing activity is also evident. With antioxidants present, the phenothiazine was best, with the diamine and Philblack O close seconds. The hydroquinone monobenzyl ether maintained low hardness but allowed tear and elongation to fall off badly. Compared with Examples 7 and 8, which follow, we see that the 2,4-dichlorobenzoyl peroxide used here has tended to reduce the elongations generally, probably by reacting with and reducing the effective concentration of the antioxidants.

Recipe:

| | |
|---|---|
| Methylphenyl vinyl siloxane gum | 100.0 |
| Antinerve agent | 1.0 |
| Valron | 50.0 |
| Zinc oxide | 5.0 |
| 2,4-dichlorobenzoyl peroxide | 0.3 |
| Antioxidant | 1.0 |

| | Mod. | T | E | H | Tr |
|---|---|---|---|---|---|
| No antioxidant | | | | | |
| Press | 250 | 675 | 1,000 | 42 | -------- |
| Oven | 655 | 1,015 | 350 | 75 | 240 |
| Age | -------- | 720 | 40 | 85 | 30 |
| N,N′-di-β-naphthyl-p-phenylenediamine | | | | | |
| Press | 50 | 95 | 990 | 25 | -------- |
| Oven | 260 | 1,220 | 690 | 63 | 220 |
| Age | 530 | 780 | 260 | 80 | 200 |
| Hydroquinone monobenzyl ether | | | | | |
| Press | 25 | 80 | 1,065 | 20 | -------- |
| Oven | 390 | 940 | 540 | 65 | 160 |
| Age | 610 | 610 | 100 | 78 | 70 |
| Phenothiazine | | | | | |
| Press | 75 | 80 | 925 | 17 | -------- |
| Oven | 360 | 1,560 | 650 | 65 | 270 |
| Age | 510 | 825 | 265 | 78 | 210 |
| Philblack O | | | | | |
| Press | 15 | 70 | 1,000 | 20 | -------- |
| Oven | 290 | 1,220 | 675 | 63 | 190 |
| Age | 540 | 855 | 290 | 80 | 242 |

*Example 7*

An even more active curing agent, dicumyl peroxide, is combined with a very reactive gum in this example. Note that in the absence of antioxidant, the properties deteriorate even more rapidly than in Example 6. In the presence of antioxidants, the greater degree of cure of these recipes (due to peroxide plus gum and Valron plus gum) results in generally better properties after press or oven cures and after aging.

In contrast to Example 6, we note also that the antioxidant action is more pronounced here. It is apparent that dicumyl peroxide has had less effect on the antioxidant than in Example 6, where 2,4-dichlorobenzoyl peroxide was used. This example shows several practical recipes featuring high press hardness, excellent oven-cured properties, and excellent aging. The order of antioxidant effectivity is similar to that of earlier examples. Again, thiourea was found to be quite effective as a curing agent. It showed little loss in properties between oven-cured and oven-aged tests, and is evidently an effective antioxidant although the recipe is somewhat more tightly cured than the rest of the series.

Recipe:

| | |
|---|---|
| Methyl-phenyl-vinyl-siloxane gum | 100.0 |
| Antinerve agent | 1.0 |
| Valron | 50.0 |
| Zinc oxide | 5.0 |
| Dicumyl peroxide | 0.3 |
| Antioxidant | 1.0 |

| | Mod. | T | E | H | Tr |
|---|---|---|---|---|---|
| No antioxidant | | | | | |
| Press | 845 | 915 | 430 | 52 | ----- |
| Oven | 980 | 980 | 200 | 75 | 140 |
| Age | ----- | 750 | 40 | 86 | 15 |
| N,N′-di-β-naphthyl-p-phenylenediamine | | | | | |
| Press | 255 | 595 | 1,200 | 28 | ----- |
| Oven | 305 | 1,665 | 675 | 59 | 235 |
| Age | 385 | 1,115 | 400 | 72 | 285 |
| N,N′-di-octyldiphenylamine | | | | | |
| Press | 250 | 790 | 850 | 36 | ----- |
| Oven | 400 | 1,520 | 600 | 60 | 220 |
| Age | 425 | 1,130 | 340 | 76 | 165 |
| 2,6 di-t-butyl-p-cresol | | | | | |
| Press | 70 | 330 | 1,150 | 26 | ----- |
| Oven | 280 | 1,500 | 750 | 57 | 225 |
| Age | 420 | 870 | 300 | 76 | 210 |
| 4-t-butylcatechol | | | | | |
| Press | 25 | 35 | 690 | 21 | ----- |
| Oven | 270 | 970 | 610 | 60 | 130 |
| Age | 470 | 825 | 300 | 77 | 175 |
| 1,5-dihydroxynaphthalene | | | | | |
| Press | ----- | 15 | 330 | 15 | ----- |
| Oven | 200 | 690 | 625 | 54 | 85 |
| Age | 360 | 595 | 275 | 75 | 80 |
| 2,2′-methylene-bis(4-ethyl-6-tert-butylphenol) | | | | | |
| Press | 25 | 45 | 975 | 20 | ----- |
| Oven | 300 | 1,260 | 650 | 61 | 170 |
| Age | 565 | 865 | 240 | 80 | 165 |
| Hydroquinone monobenzyl ether | | | | | |
| Press | 25 | 80 | 1,135 | 15 | ----- |
| Oven | 210 | 1,340 | 750 | 49 | 145 |
| Age | 415 | 890 | 385 | 68 | 230 |
| Phenothiazine | | | | | |
| Press | 45 | 65 | 720 | 11 | ----- |
| Oven | 185 | 1,100 | 800 | 47 | No Sample |
| Age | 290 | 955 | 540 | 63 | 175 |
| Thiourea | | | | | |
| Press | 665 | 1,315 | 625 | 65 | ----- |
| Oven | 665 | 890 | 275 | 76 | 230 |
| Age | 610 | 775 | 150 | 83 | 190 |
| Philblack O | | | | | |
| Press | 845 | 1,040 | 490 | 47 | ----- |
| Oven | 620 | 1,200 | 360 | 64 | 215 |
| Age | 530 | 960 | 252 | 75 | 220 |

*Example 8*

An equally reactive curing agent, di-t-butyl peroxide, was used here with the same reactive gum as used in Examples 5, 6 and 7. The results were practically identical with those of Example 7. The order of effectivity of antioxidants was:

Phenothiazine
N,N′-di-octyl diphenylamine
N,N′-di-β-naphthyl-p-phenylenediamine
Philblack O
Hydroquinone monobenzyl ether
4-t-butylcatechol
2,6 t-butyl-p-cresol
2,2′-methylene-bis(4-ethyl-6-t-butylphenol)

Recipe:

| | |
|---|---|
| Methyl-phenyl-vinyl-siloxane gum | 100.0 |
| Antinerve agent | 1.0 |
| Valron | 50.0 |
| Zinc oxide | 5.0 |
| Di-t-butyl peroxide | 0.3 |
| Antioxidant | 1.0 |

| | Mod. | T | E | H | Tr |
|---|---|---|---|---|---|
| No antioxidant | | | | | |
| Press | ----- | 830 | 350 | 55 | ----- |
| Oven | 880 | 880 | 200 | 77 | 95 |
| Age | ----- | 800 | 80 | 85 | 50 |
| N-N′-di-β-naphthyl-p-phenylenediamine | | | | | |
| Press | 220 | 715 | 930 | 27 | ----- |
| Oven | 270 | 1,510 | 700 | 56 | 230 |
| Age | 335 | 1,150 | 475 | 70 | 240 |
| N,N′-di-octyldiphenylamine | | | | | |
| Press | 155 | 555 | 815 | 33 | ----- |
| Oven | 330 | 1,360 | 630 | 58 | 205 |
| Age | 410 | 1,105 | 420 | 75 | 260 |
| 2,6 di-t-butyl-p-cresol | | | | | |
| Press | 30 | >305 | >1,200 | 18 | ----- |
| Oven | 250 | 1.360 | 725 | 55 | 100 |
| Age | 450 | 1,030 | 400 | 75 | 195 |
| 4-t-butylcatechol | | | | | |
| Press | 25 | 40 | 700 | 19 | ----- |
| Oven | 230 | 780 | 625 | 55 | 55 |
| Age | 360 | 800 | 380 | 74 | 125 |
| 2,2′-methylene-bis(4-ethyl-6-tert-butylphenol) | | | | | |
| Press | 20 | 25 | 790 | 15 | ----- |
| Oven | 260 | 1,200 | 725 | 57 | 115 |
| Age | 480 | 835 | 300 | 78 | 190 |
| Hydroquinone monobenzyl ether | | | | | |
| Press | 45 | 115 | 1,140 | 15 | ----- |
| Oven | 200 | 1,290 | 750 | 49 | 155 |
| Age | 295 | 975 | 500 | 62 | 230 |
| Phenothiazine | | | | | |
| Press | 55 | 65 | 600 | 16 | ----- |
| Oven | 165 | 1,010 | 810 | 48 | 160 |
| Age | 225 | 950 | 600 | 55 | 172 |
| Philblack O | | | | | |
| Press | 810 | 925 | 445 | 48 | ----- |
| Oven | 600 | 1,030 | 325 | 61 | 195 |
| Age | 610 | 810 | 175 | 73 | 146 |

*Example 9*

In Example 9, a softer gum containing methyl, phenyl, ethyl and vinyl groups, although still predominantly methyl groups, was used. Only Valron estersil was present to produce cure, and little cure was observed in the press. The antioxidants all retarded cure and aging degradation as shown by tensile elongation and hardness data. Phenothiazine was outstanding.

Recipe:

| | |
|---|---|
| Methyl-phenyl-ethyl-vinyl gum | 100.0 |
| Valron | 50.0 |
| Zinc oxide | 5.0 |
| Antioxidant | 1.0 |

| | Mod. | T | E | H | Tr |
|---|---|---|---|---|---|
| **No antioxidant** | | | | | |
| Press | 85 | 95 | 535 | 34 | -------- |
| Oven | 680 | 815 | 275 | 80 | 195 |
| Age | -------- | 735 | 25 | 90 | 20 |
| **N,N'-di-β-naphthyl-p-phenylenediamine** | | | | | |
| Press | 65 | 80 | 665 | 27 | -------- |
| Oven | 215 | 615 | 625 | 62 | 105 |
| Age | 385 | 690 | 355 | 75 | 160 |
| **Hydroquinone monobenzyl ether** | | | | | |
| Press | 50 | 55 | 650 | 28 | -------- |
| Oven | 225 | 780 | 700 | 61 | 120 |
| Age | 515 | 765 | 300 | 80 | 185 |
| **Phenothiazine** | | | | | |
| Press | 50 | 90 | 725 | 30 | -------- |
| Oven | 225 | 790 | 720 | 58 | 110 |
| Age | 320 | 815 | 500 | 69 | 155 |
| **Philblack O** | | | | | |
| Press | 50 | 65 | 615 | 32 | -------- |
| Oven | 255 | 610 | 650 | 63 | 120 |
| Age | 505 | 675 | 280 | 78 | 195 |

*Example 10*

With 2,4-dichlorobenzoyl peroxide in low concentration, as used here, a slight degree of cure was observed except in the presence of antioxidants. Fully oven-cured sample showed the desirable retarding effect of antioxidants which preserved better elongations.

Receipe:

| | |
|---|---|
| Methyl-phenyl-ethyl-vinyl-siloxane gum | 100.0 |
| Valron | 50.0 |
| Zinc oxide | 5.0 |
| 2,4-dichlorobenzoyl peroxide | 0.3 |
| Antioxidant | 1.0 |

| | Mod. | T | E | H | Tr |
|---|---|---|---|---|---|
| **No antioxidant** | | | | | |
| Press | 240 | 675 | 890 | 46 | -------- |
| Oven | 715 | 930 | 290 | 81 | 195 |
| Age | -------- | 865 | 30 | 90 | 25 |
| **N,N'-di-β-naphthyl-p-phenylenediamine** | | | | | |
| Press | 55 | 80 | 615 | 27 | -------- |
| Oven | 334 | 780 | 525 | 68 | 105 |
| Age | 300 | 300 | 100 | 87 | 70 |
| **Hydroquinone monobenzyl ether** | | | | | |
| Press | 40 | 70 | 845 | 25 | -------- |
| Oven | 460 | 740 | 400 | 73 | 135 |
| Age | -------- | 440 | 35 | 68 | 55 |
| **Phenothiazine** | | | | | |
| Press | 70 | 90 | 815 | 24 | -------- |
| Oven | 390 | 800 | 600 | 71 | 170 |
| Age | 655 | 700 | 120 | 80 | 70 |
| **Philblack O** | | | | | |
| Press | 35 | 65 | 730 | 32 | -------- |
| Oven | 330 | 770 | 550 | 68 | 120 |
| Age | 660 | 660 | 100 | 85 | 80 |

*Example 11*

With a more reactive peroxide and the same reactive gum used in Examples 9 and 10, satisfactory press cures were obtained in the presence of antioxidants, N,N'-di-β-naphthalene-p-phenylene diamine and Philblack O. All stocks containing antioxidants were superior after oven cures and after aging. The phenothiazine and the diamine gave the best protection.

Recipe:

| | |
|---|---|
| Methyl-phenyl-ethyl-vinyl-siloxane gum | 100.0 |
| Valron | 50.0 |
| Zinc oxide | 5.0 |
| Dicumyl peroxide | 0.3 |
| Antioxidant | 1.0 |

| | Mod. | T | E | H | Tr |
|---|---|---|---|---|---|
| **No antioxidant** | | | | | |
| Press | 575 | 1,025 | 640 | 53 | -------- |
| Oven | 910 | 965 | 205 | 81 | 175 |
| Age | -------- | 745 | 25 | 91 | 20 |
| **N,N-di-β-naphthyl-p-phenylenediamine** | | | | | |
| Press | 195 | 650 | 865 | 36 | -------- |
| Oven | 330 | 1,100 | 600 | 66 | 210 |
| Age | 500 | 925 | 325 | 78 | 245 |
| **Hydroquinone monobenzyl ether** | | | | | |
| Press | 45 | 100 | 950 | 26 | -------- |
| Oven | 185 | 905 | 690 | 60 | 120 |
| Age | 525 | 785 | 315 | 79 | 215 |
| **Phenothiazine** | | | | | |
| Press | 25 | 60 | 745 | 26 | -------- |
| Oven | 190 | 720 | 700 | 59 | 115 |
| Age | 365 | 810 | 465 | 75 | 125 |
| **Philblack O** | | | | | |
| Press | 480 | 900 | 645 | 52 | -------- |
| Oven | 520 | 1,100 | 425 | 73 | 235 |
| Age | 640 | 790 | 180 | 80 | 105 |

*Example 12*

Entirely similar results to those of Example 11 were found here when an active peroxide di-t-butyl peroxide was used with the reactive gum. Hydroquinone monobenzyl ether and phenothiazine apparently inhibited the cure. Phenothiazine was the most effective antioxidant, but N,N'-di-β-naphthyl-p-phenylene diamine showed the best all round properties.

Recipe:

| | |
|---|---|
| Methyl-phenyl-ethyl-vinyl-siloxane gum | 100.0 |
| Valron | 50.0 |
| Zinc oxide | 5.0 |
| Di-t-butyl peroxide | 0.3 |
| Antioxidant | 1.0 |

| | Mod. | T | E | H | Tr |
|---|---|---|---|---|---|
| **No antioxidant** | | | | | |
| Press | 600 | 935 | 555 | 51 | -------- |
| Oven | -------- | 865 | 175 | 80 | 185 |
| Age | -------- | 750 | 75 | 92 | 30 |
| **N,N'-di-β-naphthyl-p-phenylenediamine** | | | | | |
| Press | 150 | 625 | 975 | 32 | -------- |
| Oven | 300 | 1,075 | 600 | 64 | 190 |
| Age | 430 | 815 | 365 | 76 | 240 |
| **Hydroquinone monobenzyl ether** | | | | | |
| Press | 55 | 130 | 1,015 | 25 | -------- |
| Oven | 205 | 760 | 715 | 57 | 120 |
| Age | 410 | 795 | 365 | 68 | 225 |
| **Phenothiazine** | | | | | |
| Press | 90 | 110 | 790 | 27 | -------- |
| Oven | 210 | 710 | 720 | 56 | 90 |
| Age | 310 | 730 | 470 | 64 | 110 |
| **Philblack O** | | | | | |
| Press | 545 | 835 | 560 | 50 | -------- |
| Oven | 540 | 1,010 | 405 | 67 | 230 |
| Age | 610 | 795 | 200 | 79 | 115 |

*Example 13*

| | | | |
|---|---|---|---|
| Dimethyl siloxane gum | 100 | 100 | 100 |
| Valron | 45 | 45 | 45 |
| Antioxidant | None | -------- | -------- |
| 2,5-di-t-butyl hydroquinone | -------- | 5 | -------- |
| 2,5-di-t-amylhydroquinone | -------- | -------- | 5 |
| Press Cure, 15 min. @250° F. | | | |
| Oven Cure, 65 hrs. @300° F.: | | | |
| Tensile, p.s.i | 1,075 | 925 | 1,250 |
| Elongation, percent | 625 | 650 | 725 |
| Shore Hardness | 63 | 62 | 58 |
| Aged, 122 hrs. additional @300° F.: | | | |
| Tensile, p.s.i | 575 | 770 | 940 |
| Elongation, Percent | 300 | 475 | 550 |
| Shore Hardness | 73 | 68 | 65 |

These data show the effectiveness of the alkyl-substituted hydroquinones in retarding long-time high-temperature-aging of silicone rubber containing Valron estersil filler.

It has been found that silicone recipes not containing Valron estersil, but containing other fillers, do not need antioxidants and may indeed be harmed by them. It appears that the chief use of antioxidants in the systems shown herein is to retard the continued vulcanizing action of Valron estersil. By a proper choice of (*a*) gum, (*b*) peroxide, (*c*) antioxidant, one may develop satisfactory press-cured properties (chiefly hardness or firmness), oven-cured properties (maximum tensile, elongation and tear), and aged properties (minimum loss of tensile, elongation and tear and minimum gain in hardness).

All six classes of antioxidants are effective. Listed in order of effectiveness they are: The secondary amines (Class I), Phenothiazine (Class IV), carbon black (Class V), the aromatic ethers (Class II), the alkyl-substituted hydroquinones, and mono- and polynuclear phenols and dihydroxy phenols (Class III). This order of effectiveness varies with the type of gum, type of peroxide and temperature of aging.

The effectivity of the antioxidants will also be affected by the concentration used, more or less being required depending on the antioxidant, type of curing agent, reactivity of the gum and temperature of aging. I have found that amounts of antioxidant as low as 0.1 part per 100 of gum are effective, and where the antioxidant may be quite volatile, amounts as high as 10 parts may be used.

*Example 14*

The following mixtures were made on a rubber mill. The recipe is given in parts by weight.

| | A | B | C |
|---|---|---|---|
| Dimethyl silicone elastomer with a Williams' Plasticity number of 122 to 158 (GE 81465) | 100 | 100 | 100 |
| Alkoxy-protected silica (Valron) | 43 | 50 | 50 |
| Zinc oxide | 10 | 10 | 10 |
| N,N'-di-β-naphthyl-p-phenylenediamine | 1 | 1 | 1 |
| Tetramethylthiuramdisulfide | 0.1 | 0.1 | 0.1 |
| Press cure | 10 minutes at 320° F. | | |
| Oven cure, Hrs./Temp | 5/450° F. | 5/450° F. | 24/450° F. |
| Physical properties after Oven Curing: | | | |
| Hardness, Shore A | 55 | 60 | 72 |
| Tensile Strength, p.s.i | 1,483 | 1,575 | 1,291 |
| Elongation, percent | 892 | 825 | 625 |
| Tear, lbs/in | 221 | 250 | 276 |
| Physical properties after 70 hours' aging, 350° F.: | | | |
| Hardness, Shore A | 60 | 63 | 73 |
| Tensile Strength, p.s.i | 1,243 | 1,428 | 1,252 |
| Elongation, percent | 800 | 717 | 550 |
| Physical properties after 70 hours' aging, 450° F.: | | | |
| Hardness, Shore A | 76 | 82 | 84 |
| Tensile Strength, p.s.i | 673 | 860 | 822 |
| Elongation, percent | 233 | 275 | 233 |

This example shows that my antioxidant N,N'-di-β-naphthyl-p-phenylenediamine may be used in conjunction with a free-radical-generating substance, tetramethylthiuramdisulfide, which is used to initiate the cure before the alkoxy-protected silica has had a chance to undergo curing activity. The copending application of Thomas S. Moroney, Serial No. 590,118, lists a number of such free-radical generators.

I believe that thiourea, used in place of the antioxidant in Examples 5 and 7, is also a free-radical generator or curing substance, and I have found that antioxidants of my type I may be used in conjunction with thiourea which serves as a curing agent.

I have also found that antioxidants of all six types may be used in the presence of triethylamine in diorgano polysiloxanes and butoxy-coated silica estersils. Triethylamine serves as a vulcanizing agent for this system. I do not know the mechanism of this reaction. It may be a free-radical generation or it may be a simple de-esterification reaction of the estersil resulting in a combination of de-esterified silica and the polysiloxane. In any case, my antioxidants, as in other examples, control, modulate, and regulate the further action of the estersil on the rubber during air-oven-curing or aging.

The invention claimed is:

1. A composition comprising 100 parts by weight of a rubbery, polymeric dimethylsiloxane having dispersed therein an antioxidant and an organic pulverulent solid consisting essentially of substrate particles of inorganic siliceous material in a supercolloidal state of subdivision having chemically bound thereto per 100 square milli-microns of substrate surface at least 100 —OR groups, wherein R is a hydrocarbon radical containing 2 to 18 carbon atoms and the carbon atom attached to oxygen is also attached to at least one hydrogen, the substrate particles having an average specific area of from 25 to 900 square meters/gram.

2. A composition comprising 100 parts by weight of a rubbery, polymeric dimethylsiloxane having dispersed therein up to 10 parts by weight of an antioxidant and an organic pulverulant solid consisting essentially of substrate particles of inorganic siliceous material in a supercolloidal state of subdivision having chemically bound thereto per 100 square milli-microns of substrate surface at least 100 —OR groups, wherein R is a hydrocarbon radical containing 2 to 18 carbon atoms and the carbon atom attached to oxygen is also attached to at least one hydrogen, the substrate particles having an average specific area of from 25 to 900 square meters/gram.

3. A composition comprising 100 parts by weight of a rubbery, polymeric dimethylsiloxane having dispersed therein up to 10 parts by weight of an antioxidant selected from the class consisting of (1) secondary aryl mono amines, (2) aliphatic and aromatic diamines, (3) aromatic ethers, (4) mono- and polynuclear phenols and dihydroxyphenols, (5) thiazines, (6) carbon blacks and (7) alkyl-substituted hydroquinones and an organic pulverulant solid consisting essentially of substrate particles of inorganic siliceous material in a supercolloidal state of subdivision having chemically bound thereto per 100 square milli-microns of substrate surface at least 100 —OR groups, wherein R is a hydrocarbon radical containing 2 to 18 carbon atoms and the carbon atom attached to oxygen is also attached to at least one hydrogen, the substrate particles having an average specific area of from 25 to 900 square meters/gram.

4. A vulcanized silicone rubber composition as set forth in claim 3, wherein the antioxidant is a secondary aryl mono amine.

5. A vulcanized silicone rubber composition as set forth in claim 3, wherein the antioxidant is an aromatic diamine.

6. A vulcanized silicone rubber composition as set forth in claim 3, wherein the antioxidant is an aromatic ether.

7. A vulcanized silicone rubber composition as set forth in claim 3, wherein the antioxidant is a polynuclear phenol.

8. A vulcanized silicone rubber composition as set forth in claim 3, wherein the antioxidant is carbon black.

9. A vulcanized product resulting from a composition comprising 100 parts by weight of a rubbery, polymeric dimethylsiloxane having dispersed therein up to 10 parts by weight of an antioxidant and an organic pulverulant solid consisting essentially of substrate particles of inorganic siliceous material in a supercolloidal state of subdivision having chemically bound thereto per 100 square milli-microns of substrate surface at least 100 —OR groups, wherein R is a hydrocarbon radical containing 2 to 18 carbon atoms and the carbon atom attached to oxygen is also attached to at least one hydrogen, the substrate particles having an average specific area of from 25 to 900 square meters/grams.

References Cited in the file of this patent

UNITED STATES PATENTS

| | | |
|---|---|---|
| 2,666,041 | Pfeifer | Jan. 12, 1954 |
| 2,777,827 | Doede et al. | Jan. 15, 1957 |